United States Patent [19]

Tsao

[11] Patent Number: 5,036,186
[45] Date of Patent: Jul. 30, 1991

[54] SHADING CORRECTION SYSTEM FOR USE WITH AN OPTICAL SCANNER

[75] Inventor: Chyi Tsao, Taipei, Taiwan

[73] Assignee: ACER Incorporated, Taipei, Taiwan, Taiwan

[21] Appl. No.: 514,756

[22] Filed: Apr. 26, 1990

[51] Int. Cl.$^5$ .............................................. H01J 40/14
[52] U.S. Cl. ................................ 250/208.1; 250/208.3
[58] Field of Search ............................... 250/234–236, 250/208.1, 208.3; 358/474, 475, 480, 481

[56] References Cited

U.S. PATENT DOCUMENTS 4,150,402 4/1979 Tietz et al. ............................ 250/235
4,539,478 9/1985 Sano ..................................... 250/235
4,673,811 6/1987 Looschen ............................. 250/235
4,757,191 7/1988 Shimada et al. ..................... 250/235

Primary Examiner—David C. Nelms
Assistant Examiner—Khaled Shami
Attorney, Agent, or Firm—James S. Hsue

[57] ABSTRACT

An improved shading correction system is disclosed where the light intensity variations of the light sources are sensed and are fed back to the shading correction system for improved shading correction. Such feedback action may be applied both during the recording of shading profile reference values when a reference target is scanned and for shading correction when the actual target is scanned.

11 Claims, 6 Drawing Sheets

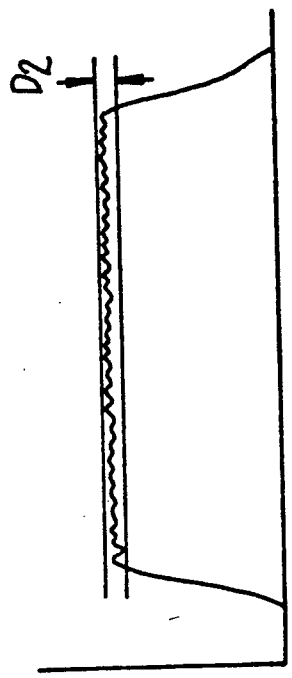
FIG._3.
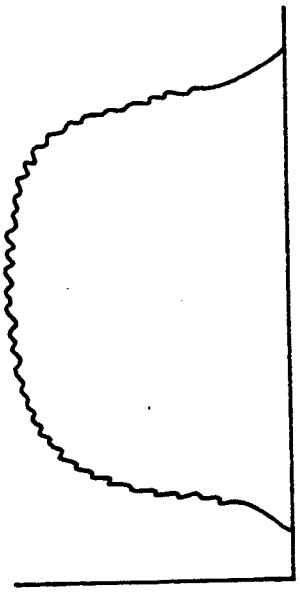
FIG._4.
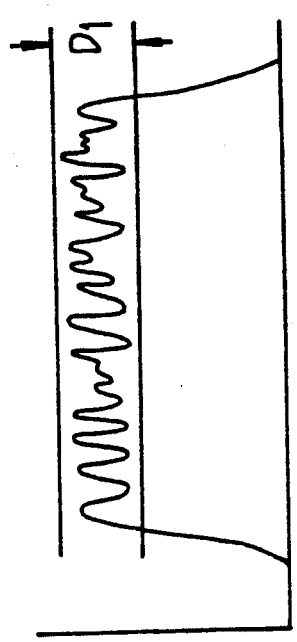
FIG._2.
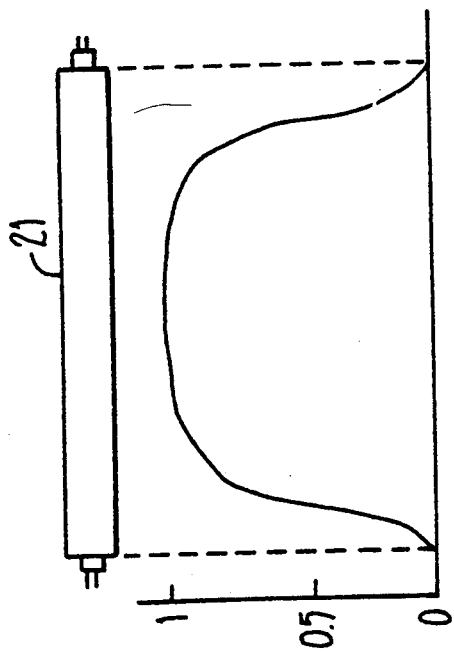
FIG._1.

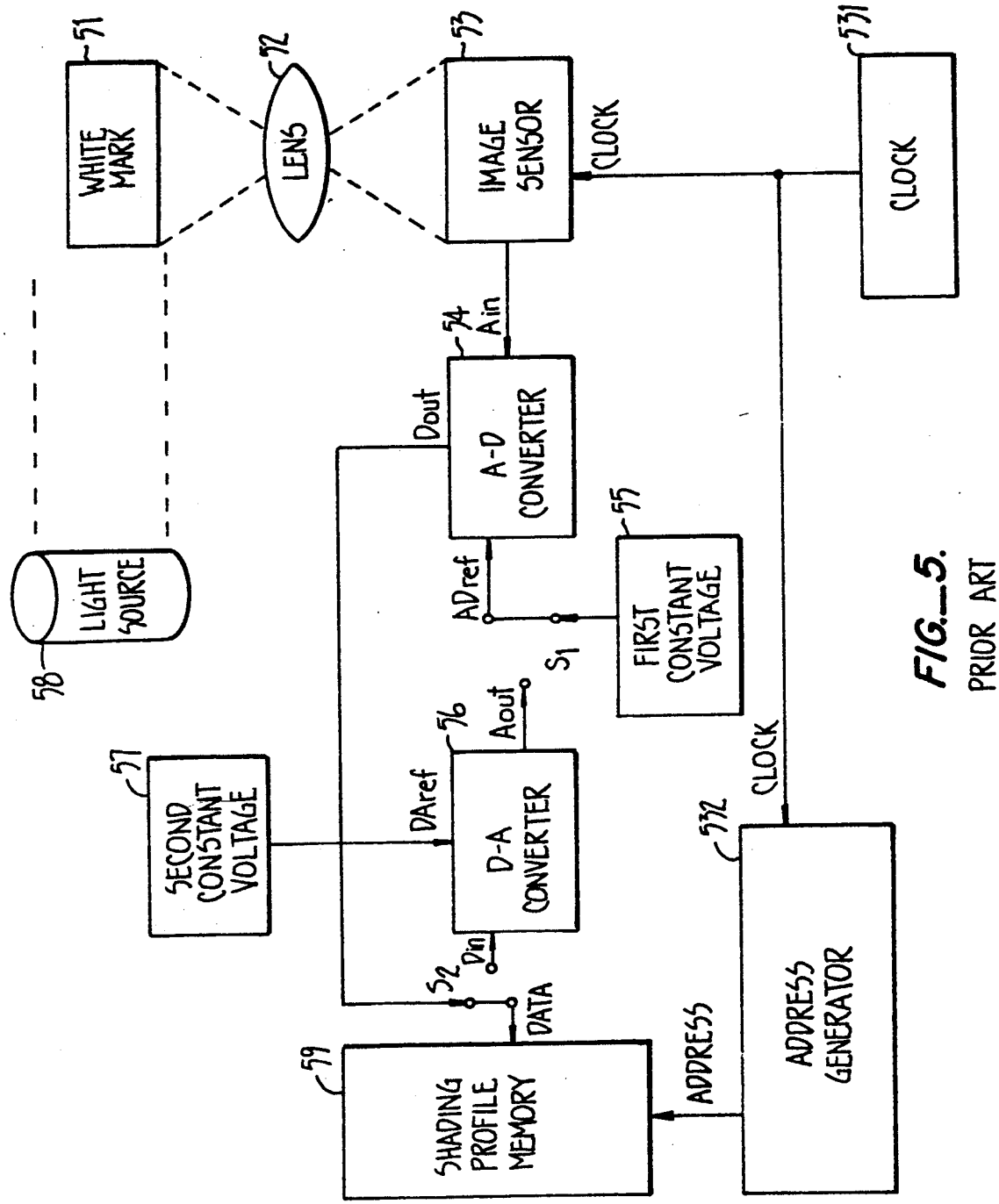
FIG._5.
PRIOR ART

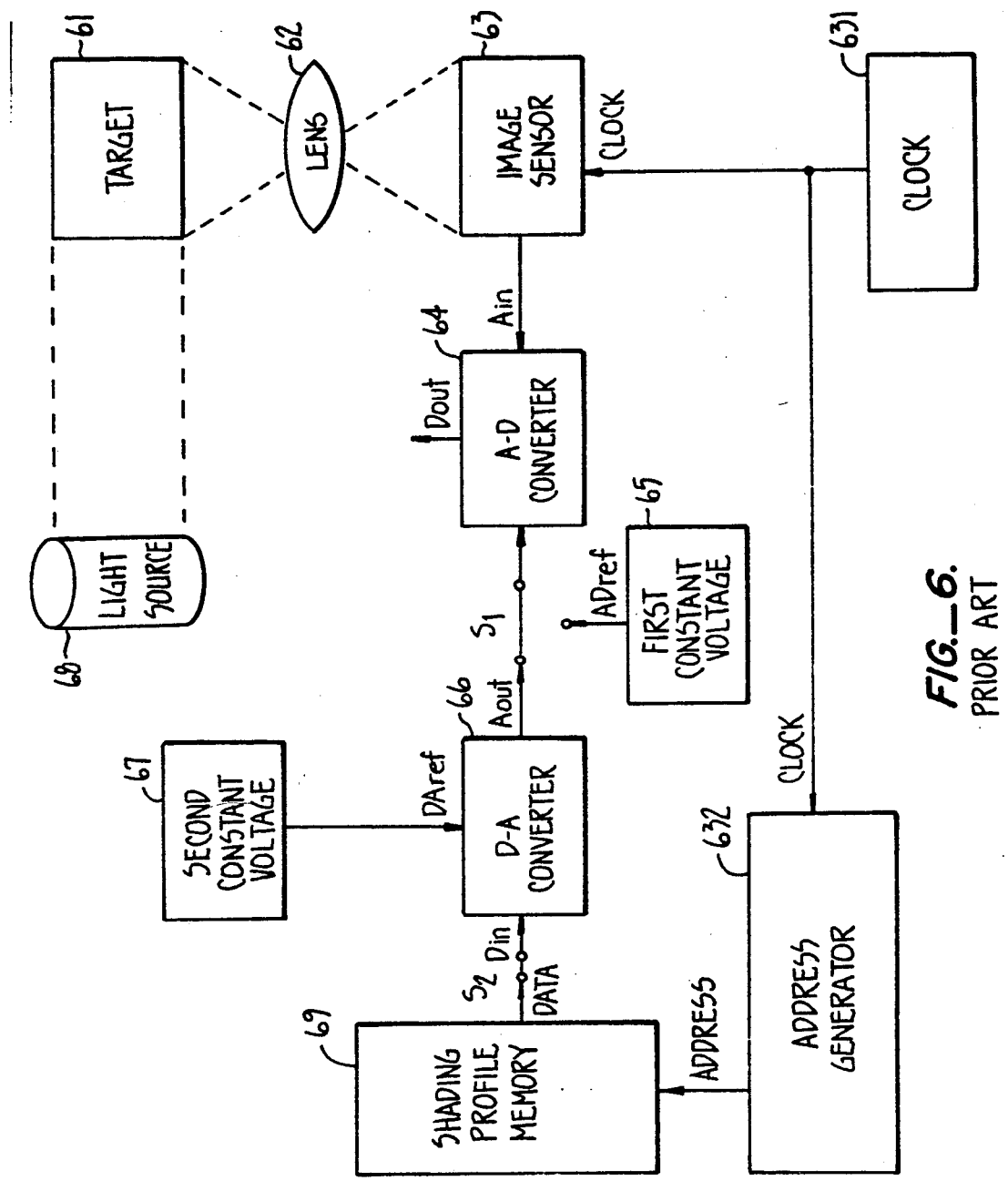
FIG._6.
PRIOR ART

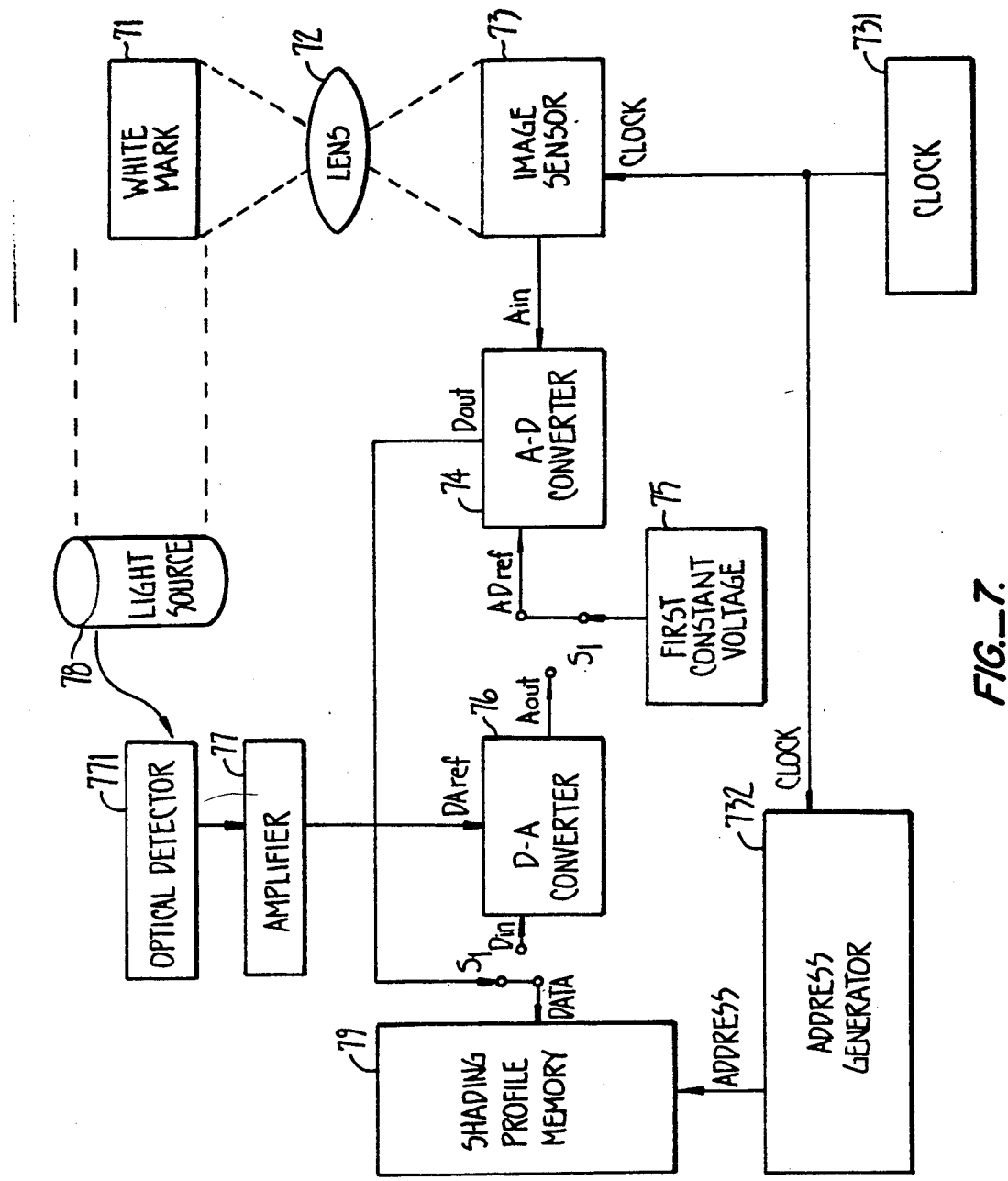
FIG._7.

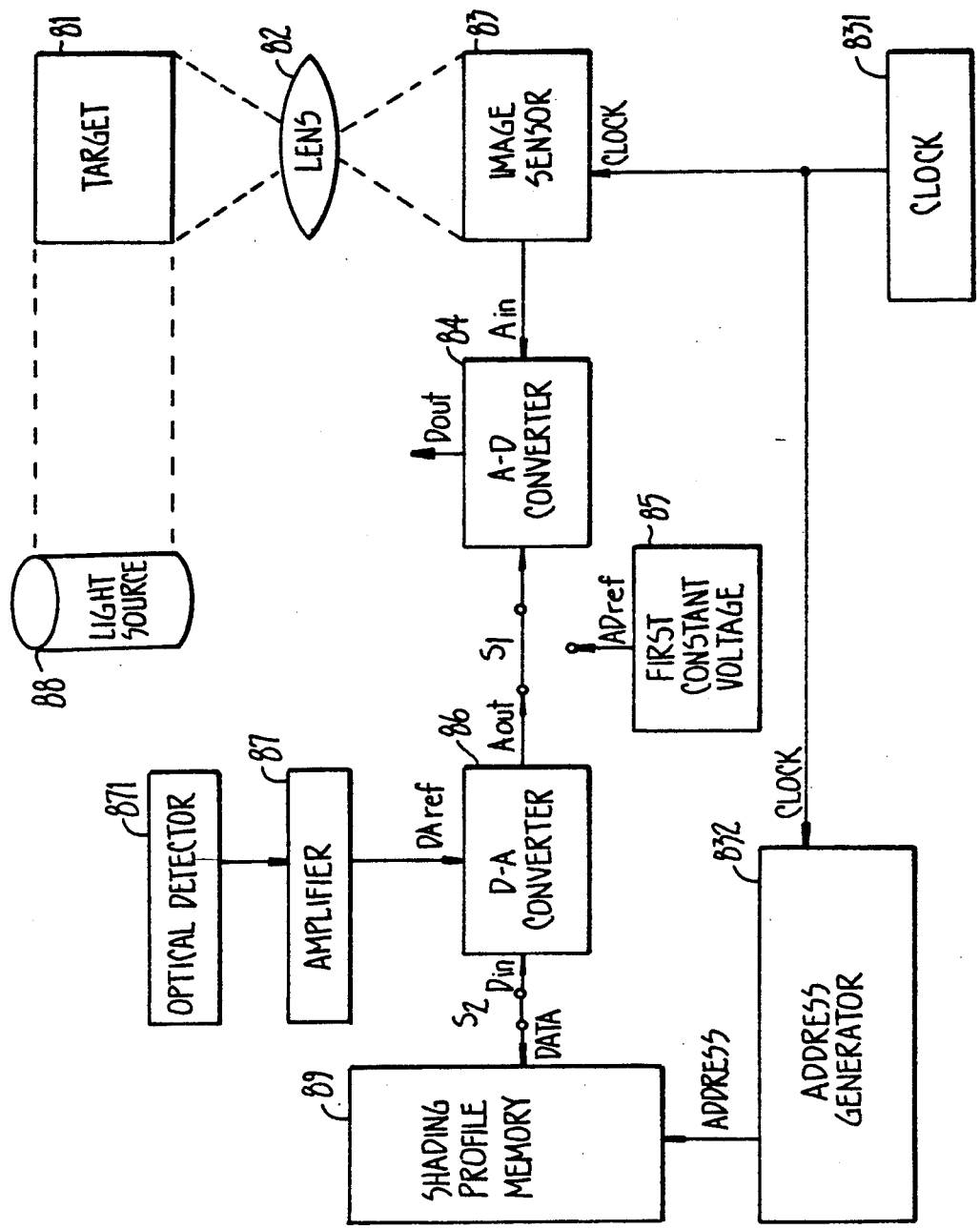
FIG._8.

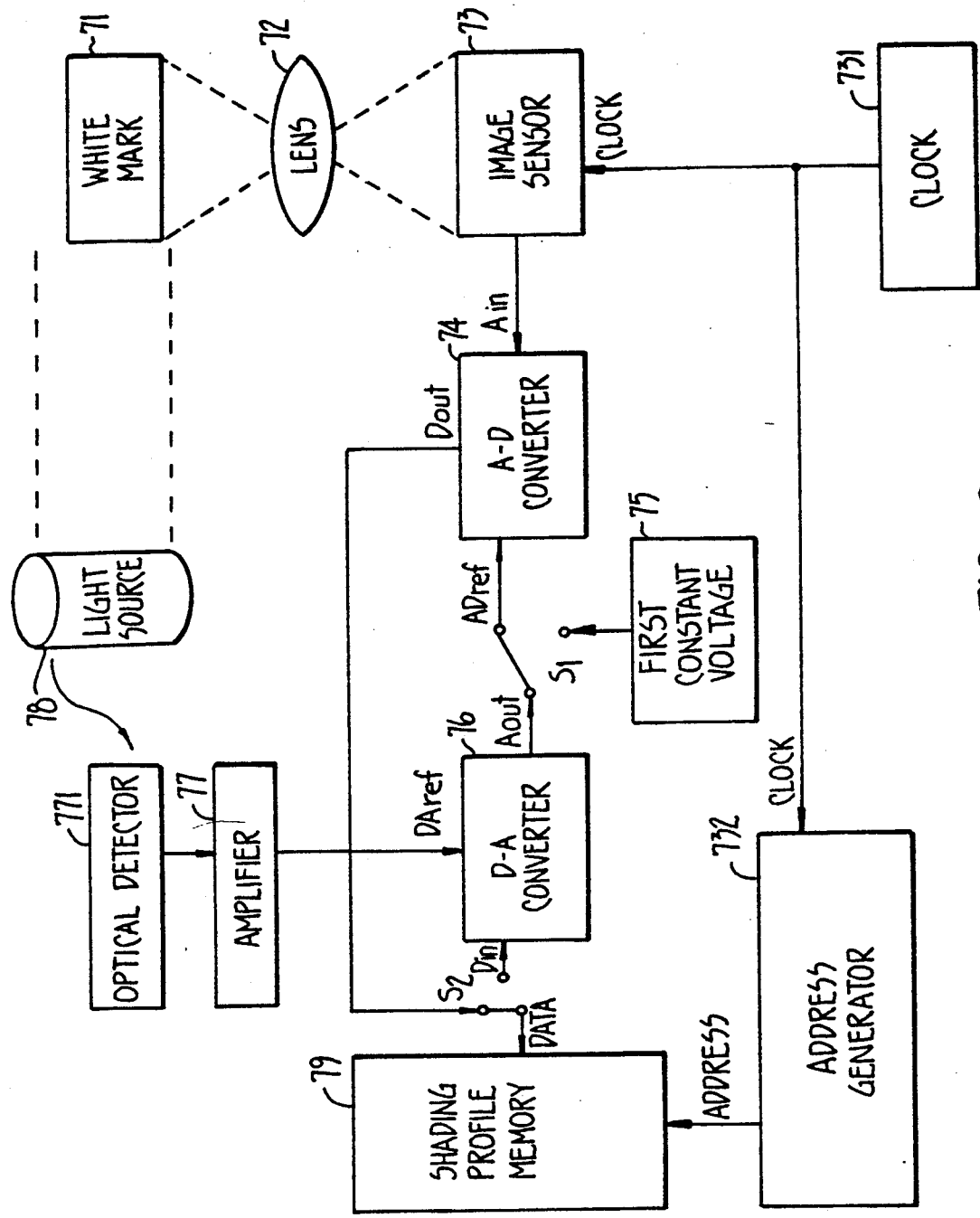
FIG._9.

SHADING CORRECTION SYSTEM FOR USE WITH AN OPTICAL SCANNER

BACKGROUND OF THE INVENTION

This invention relates in general to optical scanners and in particular to an improved shading correction system for improving the performance of optical scanners.

When an optical target is scanned by an optical scanner, the performance of the scanner is affected by a number of factors. The light source for illuminating the target, such as an elongated fluorescent lamp, may emit light of non-uniform intensity along the length of the lamp. Light reflected by the target is usually scanned by an image sensor for sensing light reflected from different portions of the target. A lens is usually used for projecting light reflected by the target onto the image sensor. The action of the lens is such that light transmitted through the center portion of the lens is of higher intensity than light transmitted through the edges of the lens according to the cosine-fourth-power law, in a phenomenon known as vignetting of lenses.

In order to reduce errors, a conventional technique uses a reference target such as a white mark which is first scanned by an optical scanner. The light intensity signals detected by the image sensor when the white mark is scanned are recorded as shading profile values stored for the optical scanner system. The scanner may be of the type where the image sensor is moved between a number of predetermined positions for scanning different portions of a target. Thus for each particular position of the image sensor for sensing a predetermined portion of the target, a shading profile value is stored for shading correction. When an actual target is then subsequently scanned, the output of the image sensor at each of the predetermined positions is then corrected using the shading profile value for such position of the image sensor to reduce errors caused by non-uniform lighting effects and vignetting of the lens.

While the above shading correction scheme does reduce errors caused by non-uniform lighting and vignetting of lens, the result achievable by such scanning systems are still not entirely satisfactory and further improvements are desirable.

SUMMARY OF THE INVENTION

The light sources used in optical scanning systems for illuminating targets are usually powered electrically. Since the power supply for such light sources may vary over time, the light intensity of such sources may also vary over time. This invention is based on the observation that light intensity variation of the light source over time is another source of errors in optical scanning systems, and that such errors may be corrected by sensing and recording light intensity variations of the light source over time and using the light intensity variations recorded to correct the optical scanning system output.

The shading correction system of this invention is for use with an optical scanner that includes (a) a reference target, (b) a light source for supplying light to the reference target and to an actual target to be scanned so that the light supplied is modulated by the reference target and the actual target. The optical scanner also includes (c) an image sensor suitable for scanning light modulated by different portions of the reference target and for scanning light modulated by different portions of the actual target to provide outputs. The shading correction system of this invention includes an optical detector for detecting light from the light source when the source is supplying light to either one of the two targets. The optical detector provides reference signals for indicating variation of intensity of light supplied by the source. The system also comprises means responsive to the reference signals for modifying the output of the image sensor to reduce the effects of said light intensity variation of the source on the image sensor output.

BRIEF DESCRIPTION OF THE DRAWINGS

FIG. 1 is a graphical illustration of the output signal of an image sensor sensing light from a light source.

FIG. 2 is a schematic view of a fluorescent tube lamp and a graphical illustration of the intensity of the light emitted by the tube along its length.

FIG. 3 is a graphical illustration of the output signal from an image sensor in an optical scanner where shading correction has not been applied.

FIG. 4 is a graphical illustration of the output signal of an image sensor in an optical scanner after shading correction has been applied.

FIG. 5 is a functional block diagram of a conventional shading correction system in a mode of operation for recording the shading profile reference values used for shading correction.

FIG. 6 is a functional block diagram of a conventional shading correction system in a mode of operation for correcting the image sensor output using recorded shading profile reference values.

FIG. 7 is a functional block diagram of a shading correction system for recording shading profile reference values to illustrate an embodiment of the invention.

FIG. 8 is a functional block diagram of a shading correction system for correcting the image sensor output using recorded shading profile reference values to illustrate the preferred embodiment of the invention.

FIG. 9 is a functional block diagram of a shading correction system for recording shading profile reference values to illustrate the preferred embodiment of the invention.

DETAILED DESCRIPTION OF THE INVENTION

FIG. 1 is a graphical illustration of the image sensor outputs of an optical scanner for sensing light emanating from a fluorescent tube. As shown in FIG. 1, the sensor output fluctuates when the image sensor is in different positions for sensing light reflected from a mark or target. One of the reasons for the fluctuation is that the temperature of the fluorescent tube lamp may vary. When the temperature of the tube lamp increases or decreases, the light intensity also increases or decreases. Temperature variations may be caused by variations of power supplied to the fluorescent tube lamp. FIG. 2 is a schematic view of a fluorescent tube lamp and a characteristic curve illustrating the light intensity emitted along its length. From FIG. 2, it is evident that the intensity of light emitted by the tube lamp falls off rapidly at the two ends of the tube compared to that at the center. The average intensity of the light emanating from the two ends of the tube is only about one-half of the intensity of light emitted from the middle portion of the tube.

Many solutions have been proposed to correct non-uniform lighting effects caused by the characteristics of the fluorescent tube lamp illustrated in FIG. 2. In one proposal, light from the fluorescent tube lamp 21 is first passed through a shading correction mask before the light is passed to the lens, where the mask is a light shield (not shown in the Figures) with a bone-shaped slot. Because of the shape of the slot, the two ends of the slot will permit more light to pass through than the middle portion of the slot, thereby compensating for the lower average intensity of light originating from the two ends of tube 21 to improve the uniformity of lighting.

FIG. 3 is a graphical illustration of the image sensor output before shading correction is applied. As shown in FIG. 3, portion D1 illustrates the portion of the output curve of the image sensor where the output is influenced by a number of distortions. One source of the distortion is the non-uniformity of light from the fluorescent tube lamp. Another source of distortion is the non-uniformity of light sensing elements present in the image sensor. FIG. 4 is a graphical illustration of the image sensor output from an optical scanner for portion D2 of the characteristic curve which is a relatively flat profile, where at least for the middle portion of the tube lamp, light emitted by the tube has a rather uniform intensity. FIG. 4 illustrates the profile of a shading corrected image sensor in a scanning system which meets required performance standards.

The image sensor used in conventional optical scanners includes a charge coupled device made from semiconductors, a photodiode, a storage electrode, and an analog shift register. FIG. 5 is a functional block diagram of a shading correction system for recording shading profile reference values used in conventional systems. The system of FIG. 5 is explained in detail as follows.

A target or mark 51 is illuminated by light source 58. Light reflected from target 51 is passed through a lens 52 and is sensed by image sensor 53. The output of sensor 53 is an analog signal Ain. Such analog signal Ain is converted by an A-D converter 54 into a digital signal Dout. Such digital signal is transmitted to the input/output interface of the optical scanner or to a system control interface either for displaying such signal or for control and processing by a computer or other central processing units.

Described above are a number of factors which affect the accuracy of the image sensor, such as nonuniform lighting effects, vignetting of the lens, and non-uniform density of light sensing elements in the image sensor. In order to correct such errors, conventional shading correction systems first record the output of the image sensor when a reference target, such as a white mark, is scanned. When a target is scanned, such as the reference target, the image sensor is moved between predetermined positions for sensing the light reflected by different portions of the target. When the reference target is scanned, for each position of the image sensor, the sensor output is recorded as the shading profile reference value for such position of the sensor. After the entire reference target has been scanned, the sensor outputs corresponding to the different sensor positions form a shading profile of the sensor.

When an actual target is then scanned by the image sensor using the same light source and the same lens, the shading profile reference value corresponding to the position of the sensor is fetched when the sensor is at such position sensing the light reflected from the actual target. The shading profile reference value fetched is then used to correct the sensor output to reduce the effects of various factors affecting the accuracy of the sensor.

FIG. 5 is a functional block diagram of a conventional shading correction system in a mode of operation for recording the shading profile. As shown in FIG. 5, the image sensor output Ain is converted by the A-D converter 54 into a digital output Dout which is fed to a shading random access memory (shading RAM) 59 where the signal Dout is stored as the shading profile reference value of sensor 53 at a particular scanning position of the sensor. The address generator 532 generates an address in memory 59 at which the reference value is to be stored. Clock 531 operates both image sensor 53 and address generator 532. Clock 531 and address generator 532 are used to ensure that the shading profile reference value stored into or retrieved from memory 59 is indeed the output of sensor 53 at a particular position of the sensor. The shading profile of the scanning system is the set of shading profile reference values corresponding to all the predetermined scanning positions of the image sensor. Thus before an actual target is scanned, a reference target such as a white mark 51 is first scanned by sensor 53 in order to record the shading profile reference values for shading correction.

The A-D converter 54 of FIG. 5 has the following transfer function:

$$Dout = 2^{(N-1)} \times \frac{Ain}{(ADref)}, \quad (1)$$
$$N = 1, 2, 3 \ldots$$

where the output Dout is a digital signal of N bits, Ain is the output of the image sensor, and ADref is the reference voltage supplied by the first constant reference voltage 55.

The value of the first constant reference voltage 55 is set by the designer in accordance with product specifications. The D-A converter 56 and the second constant reference voltage 57 are not used when the shading profile is recorded.

FIG. 6 is a functional block diagram of a conventional shading correction system in a mode of operation where an actual target is scanned. Shading RAM 69 stores a shading profile including shading profile reference values recorded in a manner discussed above in reference to FIG. 5. The actual target 61 is illuminated by a light source 68. Reflections from target 61 are transmitted through lens 62 towards an image sensor 63. When sensor 63 is at a particular scanning or sensing position, clock 631 and address generator 632 cause the shading profile reference value stored in shading RAM 69 corresponding to such position of sensor 63 to be fetched from shading RAM 69 and appears at its output. Such value is provided through switch S2 as an input Din to the D-A converter 66 which converts Din into an analog output Aout. The signal Aout is then provided to the A-D converter 64 as a reference voltage. Converter 64 converts the output Ain of sensor 63 into digital output Dout using the reference voltage from converter 66 for shading correction. The transfer function of converter 64 is the same as that of converter 54.

As described above, the transfer function of converter 54 is given by equation (1) above. In the mode of operation of FIG. 5, the reference voltage ADref from the first constant reference voltage 55 is used as the reference voltage in equation (1) for converting the sensor outputs into digital values suitable for storage by the shading RAM. In the mode of operation of FIG. 6, however, the reference voltage ADref in equation (1) is not the constant voltage 65. Switch S1 connects converter 64 to converter 66 instead of to constant voltage 65. Therefore, for the mode of operation in FIG. 6, the quantity ADref in equation (1) is replaced by the output Aout of converter 66, so that the output Dout is corrected for shading.

In FIG. 6, converter 66 has the following transformation or transfer function:

$$Aout = DAref \sum_{k=1}^{N} \frac{Dink}{2^{(k-1)7}} \qquad (2)$$
$$= DAref \left( Din1 + \frac{Din2}{2^1} + \frac{Din3}{2^2} + \ldots + \frac{DinN}{2^{(N-1)}} \right)$$

where Aout is the end output of converter 66 representing the shading profile reference value in digital form, DAref is the reference voltage from the second constant reference voltage 67, and Din is a digital signal representing the value of the shading profile reference value stored in the shading RAM.

The second constant reference voltage 67 is chosen by the designer in accordance with product specifications.

While the conventional shading correction system of FIGS. 5 and 6 does improve the quality of the system output Dout, such system is not entirely satisfactory. Thus, errors in the sensor output caused by variations in light intensity of source 68 and 58 over time still are not corrected.

FIG. 7 is a functional block diagram of a shading correction system illustrating an embodiment of the invention. A comparison of FIGS. 5 and 7 will indicate that they are essentially the same except that the second constant reference voltage 57 of FIG. 5 has been replaced by an optical detector 771 and an amplifier 77 where detector 771 detects light from source 78. In the mode of operation illustrated in FIG. 7 which is one embodiment of the invention, however, detector 771 and amplifier 77 are not used in the recording of shading profile reference values; these two components are used in the preferred embodiment of FIG. 9. Hence, the shading profile reference values recorded by shading RAM 79 are essentially the same as those recorded using the conventional shading correction system of FIG. 5. Except for blocks 771 and 77, the different functional blocks in FIG. 7 function in essentially the same manner and achieve essentially the same result as the corresponding functional block diagrams in FIG. 5 so that the functions of these blocks will not be elaborated in detail.

FIG. 8 is a functional block diagram of a shading correction system to illustrate the preferred embodiment of the invention when an actual target is scanned. A comparison of FIGS. 6 and 8 will indicate that the system of FIG. 8 differs from that of FIG. 6 only in that the second constant reference voltage 67 has been replaced by an optical detector 871 and an amplifier 87 for providing the reference voltage DAref. Thus, the remaining functional blocks of FIG. 8 function in essentially the same way as the corresponding blocks in FIG. 6 so that the discussion below will focus on where they differ from those of FIG. 6.

An actual target 81 is illuminated by a light source 88. Reflections from the target are passed through lens 82 and are sensed by an image sensor 83. Clock 831 and address generator 832 cause a shading profile reference value corresponding to particular position of sensor 83 to be fetched from shading RAM 89 and is provided as output through switch S2 and is supplied to input Din of converter 86. The output of D-A converter 86 is applied as a reference voltage to A-D converter 84, as is performed by the corresponding blocks in FIG. 6, where the reference voltage is used for converting output Ain of sensor 83 into a digital signal Dout which is then used as the output of the optical scanner. Such functions are analogous to those of the corresponding blocks in FIG. 6. However, when the shading profile reference value Din is converted into an analog output Aout in converter 86, the reference voltage used DAref is not a constant reference voltage as in FIG. 6, but is a variable one which has been adjusted to compensate for variations in light intensity from source 88. Thus light from source 88 is sensed by detector 871 whose output is amplified by amplifier 87. The amplified detector output is then applied to converter 86 as the reference voltage. In other words, in Equation (2) above, the quantity DAref is the output of amplifier 87 of FIG. 8 instead of the second constant reference voltage 67 of FIG. 6.

FIG. 8 illustrates the mode of operation of the shading correction system of this invention where an actual target 81 is scanned. In such mode, switch S1 causes the output Aout of converter 86 to be applied to converter 84 instead of the first constant reference voltage 85 as in FIG. 7. Since the reference DAref is provided by optical detector 871, it varies in accordance with the intensity of light emitted by source 88. Therefore, the output Aout of converter 86 reflects not only the shading correction provided by the shading profile reference value from shading RAM 89, but it also reflects the variation of light intensity from source 88. Aout therefore provides a reference to converter 84 which further reduces errors and distortions compared to the conventional system of FIG. 6.

The signal path from source 88 to detector 871 (through light signals) and then through amplifier 87, converter 86 and converter 84 forms a feedback loop which improves the performance of the optical scanner. When the actual target is scanned as shown in FIG. 8, switch S2 causes the output of shading RAM 89 to be applied to the input Din of converter 86; where a reference target is scanned as in FIG. 7, switch S2 connects the output Dout from converter 74 or 84 to shading RAM 79 or 89 as an input. In the preferred embodiment, detector 771 (871) provides a current which varies as a function of light intensity detected and amplifier 77 (87) converts the current signal into voltage signal.

FIG. 9 is a functional block diagram of a shading correction system operating in a mode where shading profile reference values are recorded. A comparison of FIGS. 7 and 9 will indicate that whereas in FIG. 7, the reference ADref applied to converter 74 is a constant reference voltage 75, the reference ADref in FIG. 9 is provided by the output of converter 76 which receives its reference from amplifier 77 and detector 771. In other words, in FIG. 7, switch S1 connects the first constant reference voltage 75 to converter 74; in FIG. 9, switch S1 connects converter 76 to converter 74. As discussed above in reference to FIG. 8, the output of converter 76 (86 in FIG. 8) varies as a function of variations in light intensity from light source 78 because the amplified output of detector 771 is applied to converter 76 as a reference in the digital to analog conversion.

In reference to FIG. 9, the reference ADref applied to converter 74 is varied as a function of light intensity variations of source 78. Therefore, the quantity ADref in Equation (1) of converter 74 also varies as a function of the light intensity from source 78. The shading profile reference values provided at the output of converter 74 therefore provides references for shading correction which are more accurate than they would be if a constant reference voltage is applied to converter 74 as in FIG. 7. When these more accurate shading profile reference values are used as discussed in reference to FIG. 8 for shading correction, the performance of the scanner is further improved. For this reason, the configuration of FIG. 9 is preferred over that of FIG. 7.

While the invention has been described by means of different embodiments discussed above, it will be understood that various modifications in the system may be made without departing from the scope of the invention. Thus, in FIGS. 7-9, the reference target and the actual target are described as being scanned sequentially. It will be understood that the invention is applicable where both the actual target and the reference target are scanned simultaneously. This system can be arrived at by combining the systems of FIGS. 8 and 9. In such event, the output of image sensor 73 of FIG. 9 may be used as the reference ADref to converter 84 where converter 84 provides an output Dout which would be an accurate representation of the target 81 scanned. Assuming that the reference target 71 and the actual target 81 are illuminated by the same light source, the light intensity sensed by sensors 73, 83 would be affected in the same manner so that by taking the output of sensor 73 as the reference for converter 84, the effects of such variations on the scanner output can be reduced. Therefore, no optical detector is necessary. Since both targets are scanned simultaneously, the shading correction can be performed in real time and no shading RAM is necessary. While the invention has been illustrated where the image sensor is moved between predetermined positions, it will be understood that the invention is applicable also where the image sensor comprises a stationary array of sensing elements. Thus, the term "scanner" is intended to include image sensors of this type. While a separate optical detector 771, 871 may be used as in FIGS. 7-9, some of the sensing elements in image sensor 73, 83 may be used instead to eliminate the need and cost of using a separate optical detector. Still other modifications can be made without departing from the scope of the invention which is to be limited only by the appended claims.

What is claimed is:

1. A shading correction system for use with an optical scanner that includes (a) a reference target, (b) a light source for supplying light to the reference target and an actual target to be scanned so that the light supplied is modulated by the reference target and the actual target, (c) an image sensor for scanning light modulated by the reference target and light modulated by the actual target to provide outputs, and (d) means for storing as shading profile values the sensor outputs or signals derived therefrom when the reference target is scanned, each shading profile value stored being the sensor output or a signal derived therefrom when the image sensor is at a particular position in scanning motion, said system comprising:

an optical detector for sensing light from the light source when said source is supplying light to either one or both targets, said optical detector providing light variation reference signals for indicating variation of light intensity of light supplied by the source; and means responsive to the light variation reference signals for modifying the outputs of the image sensor to provide modified outputs, wherein said modifying means modified the image sensor outputs as a function of the light variation reference signals when the reference target is scanned, said modifying means providing the modified sensor outputs for storage by the storing means as shading profile values, so that the effects of light intensity variations of the light source on the shading profile values are reduced.

2. The system of claim 1, wherein said image sensor moves between a number of positions in scanning motion relative to the targets and wherein the light source supplies light sequentially to the reference target and the actual target so that the light supplied is sequentially modulated by the reference target and the actual target, wherein the image sensor scans sequentially light modulated by the reference target and light modulated by the actual target to provide outputs, said optical scanner further including means for addressing the storing means for storing or retrieving from the storing means the shading profile value corresponding to any position of the image sensor.

3. The system of claim 2, wherein when the image sensor is in one of said positions for scanning the light modified by the actual target, said addressing means retrieves from the storing means a shading profile value corresponding to said position of the image sensor, said modifying means being responsive to said shading profile value for modifying the image sensor output to provide a shading corrected sensor output corresponding to said sensor position.

4. The system of claim 3, wherein said modifying means modifies the sensor outputs in response to the light variation reference signals when the actual target is scanned so that the effects of light intensity variations of the source on the sensor outputs during scanning of the actual target are reduced.

5. The system of claim 2, wherein said image sensor outputs are analog, said modifying means comprising:

an A-D converter for converting the image sensor outputs into first digital signals, said first digital signals being supplied to the storing means for storage as the shading profile values;

wherein a light variation reference signal from the optical detector or a signal derived therefrom is applied as a reference to the A-D converter to indicate variation of light from the source when the reference target is being scanned, such reference being used by the A-D converter in the conversion so that the effects of light intensity variations of the source on the shading profile values are reduced.

6. The system of claim 5, said modifying means further comprising:

a D-A converter for converting a shading profile value retrieved from the storing means into a first analog signal which is supplied as a reference input to the A-D converter when the actual target is being scanned for shading correction, wherein when the sensor is scanning the actual target a light variation reference signal from the optical detector or a signal derived therefrom is applied as a reference to the D-A converter to indicate variation of light from the source, such reference being used by the D-A converter in the conversion so that the effects of light intensity variations of the source on the sensor image output during scanning of the actual target are reduced.

7. The system of claim 1, said scanner further including means for providing at least one shading profile value for correcting the sensor output when the actual target is scanned at least one position of the sensor, wherein said modifying means further modifies the sensor output in response to at least one light variation reference signal and said shading profile reference value when the actual target is scanned, so that the effects of light intensity variations of the source on the image sensor output during scanning of the actual target are reduced.

8. The system of claim 1, wherein the light variation reference signals are currents.

9. The system of claim 6 wherein said optical detector comprises an amplifier for amplifying said light variation reference signals and for converting such signals into voltage signals, said voltage signals being applied as references to said D-A converter.

10. The system of claim 1, wherein said light variation reference signals are voltage signals.

11. A shading correction method for use with an optical scanner that includes (a) a reference target, (b) a light source for supplying light to the reference target and an actual target to be scanned so that the light supplied is modulated by the reference target and the actual target, (c) an image sensor for scanning light modulated by the reference target and light modulated by the actual target to provide outputs, and (d) storage means, said method comprising:

sensing light from the light source when said source is supplying light to either one or both targets, and providing light variation reference signals for indicating variation of light intensity of light supplied by the source;

modifying the sensor outputs as a function of the light variation reference signals when the reference target is scanned;

providing the modified sensor outputs for storage by the storage means as shading profile values, and storing as shading profile values the sensor outputs or signals derived therefrom when the reference target is scanned, each shading profile value stored being the sensor output or a signal derived therefrom when the image sensor is at a particular position in scanning motion so that the effects of said light intensity variation of the source on the shading profile values are reduced.

* * * * *